United States Patent [19]

Elmer et al.

[11] 3,813,652

[45] May 28, 1974

[54] MEMORY ADDRESS TRANSFORMATION SYSTEM

[75] Inventors: Ben R. Elmer, Glendale; Melvin H. Eklund, Phoenix, both of Ariz.

[73] Assignee: Honeywell Information Systems, Inc., Waltham, Mass.

[22] Filed: Jan. 15, 1973

[21] Appl. No.: 323,586

[52] U.S. Cl. .......... 340/172.5

[51] Int. Cl. .......... G11c 7/00

[58] Field of Search .......... 340/172.5, 173, 174

[56] References Cited

UNITED STATES PATENTS

| | | | |
|---|---|---|---|
| 3,317,902 | 5/1967 | Michael | 340/172.5 |
| 3,562,719 | 2/1971 | Hynes et al. | 340/172.5 |
| 3,737,860 | 6/1973 | Sporer | 340/172.5 |

*Primary Examiner*—Paul J. Henon
*Assistant Examiner*—James D. Thomas
*Attorney, Agent, or Firm*—Dudley T. Ready; Edward W. Hughes; Henry K. Woodward

[57] ABSTRACT

A system is disclosed in which an input binary address is transformed into a set of module select signals and a set of address signals whereby an aggregate of memory modules, each of which may contain a different number of storage cells, are combined to form a memory assembly which has a fixed number of storage cells. The address transformation system uses signals taken from the individual modules which represent the number of memory cells contained therein.

4 Claims, 9 Drawing Figures

PATENTED MAY 28 1974 3,813,652

SHEET 6 OF 7

MEMORY ADDRESS TRANSFORMATION SYSTEM

FIELD OF THE INVENTION

This invention relates to digital computer apparatus for combining a set of memory modules to form a memory assembly which is addressable by a binary address in a conventional manner where the memory modules have different numbers of storage elements, that is, having differing sizes.

DESCRIPTION OF THE PRIOR ART

At the present time, substantially all electronic digital computer hardware is binary oriented. Binary organizations are inherently the most efficient and economical approaches to hardware design. Particularly for memory systems, it has become standard practice to design and manufacture units on the basis of powers of two. For example, current random access integrated circuit memory units typically store 1,024 ($2^{10}$) bits. Such units include circuitry which decodes an address on 10 address lines and selects one of the 1,024 storage elements for the desired read/write operations.

This design approach assumes that an integrated circuit chip has been manufactured with all elements meeting specifications. It is common practice to manufacture integrated circuits in batches and discard chips which fail to meet the specifications. Satisfactory manufacturing yields can be obtained even for quite complex integrated circuits but with increasing complexity a point is reached where the yield is no longer satisfactory. Of particular interest is a memory module disclosed in allowed U.S. Pat. application Ser. No. 307,317, "Semiconductor Mass Memory" filed Nov. 21, 1972, by John C. Hunter, assigned to the the present assignee which is preferably comprised of a complete wafer having on the order of $10^6$ semiconductor elements. In such a module, only good memory subarrays are used, which leads to a variable number of addressable memory elements. For example, there may be 1500 subarrays, each of which includes a shift register storage element. When the fabrication process results in representative yields of 40–80 percent good subarrays, the number of addressable shift registers varies from 600 to 1,200 per module. A memory subsystem using such modules and minimizing unused good subarrays could be comprised of assemblies, each assembly having 4,096 ($2^{12}$) addressable subarrays on a total of five modules.

If each module has its subarrays numbered from zero, it is then necessary to provide hardware to map the 4,096 assembly addresses into a set of module select signals and sets of module subarray addresses. If the yield should substantially improve, it may be possible to reduce the number of modules to four per assembly. An excess to higher yield modules may be disposed of by derating them to a lower size group. In general, the yield distribution of modules is variable and assembly address transformation hardware should be adaptable thereto.

Accordingly, it is an object of the invention to provide a memory assembly in which memory modules having different sizes of addressable elements are used.

It is a further object of the invention to provide address transformation hardware which is adaptable to a variable set of memory module sizes.

SUMMARY OF THE INVENTION

A memory assembly is provided in which a plurality of memory modules are used and the modules have different numbers of memory elements. The memory modules are provided with sources of size signals representing the number of addressable elements. A first subtracter responsive to the input address and the size signals from a first memory module generates a first transformed address. An inverter complements the input address signals. A second subtracter subtracts the size signal from the complemented input address to generate a second transformed address. Comparators, responsive to the input address and the module size signals, selectively enable one of the memory modules. A multiplexer, responsive to the subtracters and the comparators, generates the desired address for the selected memory module.

DESCRIPTION OF A PREFERRED EMBODIMENT OF THE INVENTION

Figure 1:
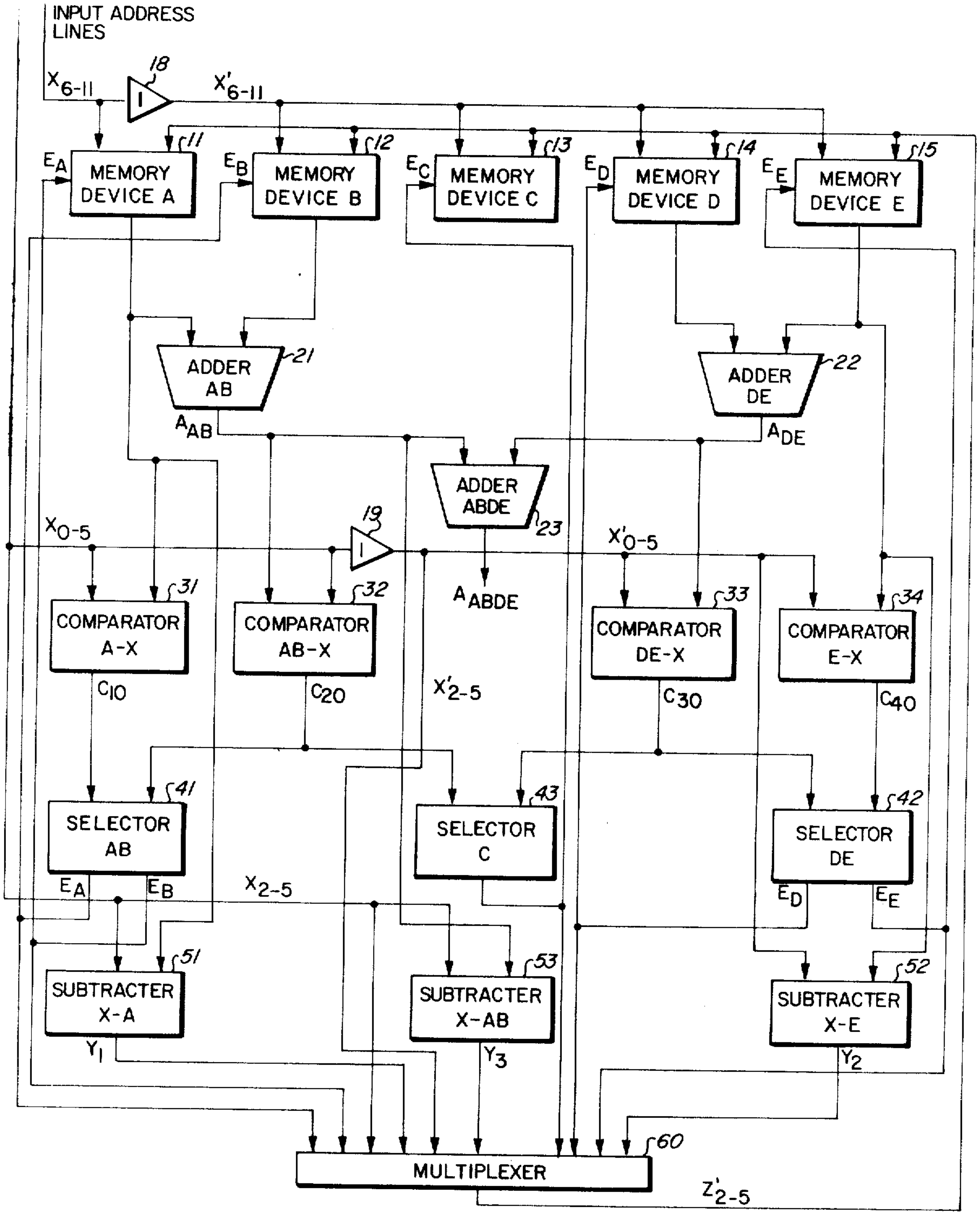
FIG. 1 is a block diagram of an address transformation system embodying the invention.

FIG. 1 is a memory assembly using memory modules which have approximately 800 addressable memory elements each on the average. Each memory module is provided with a set of output pins which are connected to the module supply voltages through fusible links that are selectively disconnected at the time of fabrication so as to provide a set of size signals representing the number of memory elements contained therein, modulo 64. Five memory modules or devices 11–15 are addressed by 12 address lines $X_{0-11}$. The six low order lines are connected to all of the memory modules through inverter 18 and the six high order lines are directed to the address transformation logic, which is preferably constructed as a single integrated circuit. A static AB adder 21, responsive to four size signals $M_A$ and $M_B$ from memory modules 11 and 12, generates a set of composite size signals $A_{AB}$ representing the sum of the two modules sizes. Similarly, static DE adder 22 is reponsive to size signals $M_D$ and $M_E$ from memory modules 14 and 15 to generate $A_{DE}$ representing the sum of the two module sizes. The ABDE adder 23 generates $A_{ABDE}$ which is the sum of $A_{AB}$ and $A_{DE}$. A comparator 31, which is comprised essentially of adder carry-look-ahead logic, compares the size signals from memory module 11 with the high order address bits. Inverter 19 inverts each of the high order address bits, which produces the complement of the address $X'_{0-5}$. Comparator 34, in a manner similar to comparator 31, compares the size signals from memory module 15 with the inverted high order memory address bits. Comparators 32 and 33 compare the sum signals $A_{AB}$ and $A_{DE}$ with the true and complemented address bits, respectively. A subtracter 51, responsive to the size signals from memory module 11 and the address signals $X_{2-5}$ generates a transformed address $Y_1$. Similarly, subtracters 52 and 53 generate transformed addresses $Y_2$ and $Y_3$ by subtracting the size $M_E$ of module 15 and the sum of the sizes of modules 11 and 12 from the addresses $X'_{2-5}$ and $X_{2-5}'$ respectively. Multiplexer 60 accepts the transformed address from subtracters 51-53, the true address $X_{2-5}$ and the inverted address $X'_{2-5}$. One of these addresses is selected as the address transformation logic output in accordance with the selection signals from selectors 41-43. Selector 41 is responsive to comparators 31 and 32 and generates memory module select signals for modules 11 and 12, which also control multiplexer 60. Similarly, selector 42 is responsive to comparators 33 and 34 for selecting modules 14 and 15 and providing further control of multiplexer 60. Selector 43, responsive to comparators 32 and 33 selects module 13 and provides the last control signal for multiplexer 60.

Figure 1A:
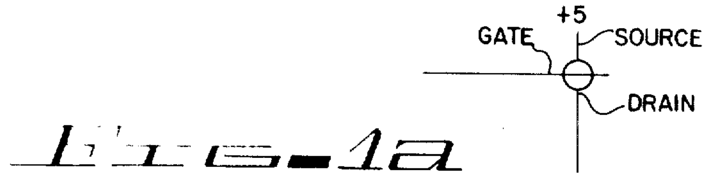
FIG. 1A is a diagram illustrating the field-effect transistor symbol used in the remaining figures.

The logic is conveniently implemented with C/MOS, complementary metal-oxide-silicon semiconductor technology for which the symbol of FIG. 1A is used to represent the field-effect transistors. FIG. 2A illustrates a half adder stage with a carry-in effectively hard-wired for use in adders 21-23, thereby converting the size numbers to start with one. In the usual relay-like logic configuration, *n* type transistors 61 are connected to generate the usual half adder carry-out:

$$C'_{out} = (a + b)'$$

where the C/MOS output logic level is inherently complemented. The *p*-type transistors 62 form the complementary logic $(a'b')$, because the inputs to the *p*-type transistors are effectively complemented relative to the *n*-type transistors. The transistor sections 61 and 62 form a bridge between supply voltages of + 5 and − 5 volts whereby the center point $C'_{out}$ is at approximately + 5 volts for a "1" signal and − 5 volts for a "0" signal. Similarly, transistors 63 generate the sum:

$$S' = (C'_{out} + ab)'$$

Transistors 64 effectively form the dual of the sum function so that $S'$ is at either a + 5 or − 5 volt level. The pair of transistors 65 invert the first level output, $C_{out} = (C'_{out})'$.

Figure 2B:
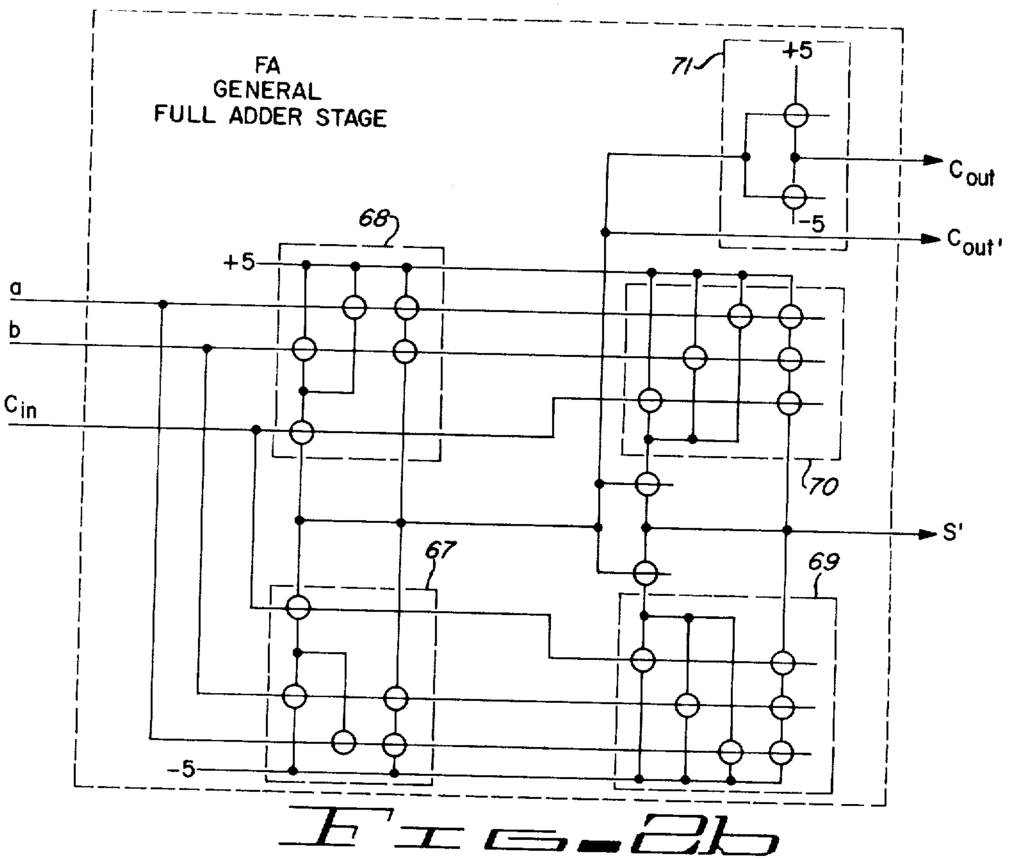
FIG. 2B is a schematic diagram of a full adder stage used in FIG. 1.
Figure 2A:
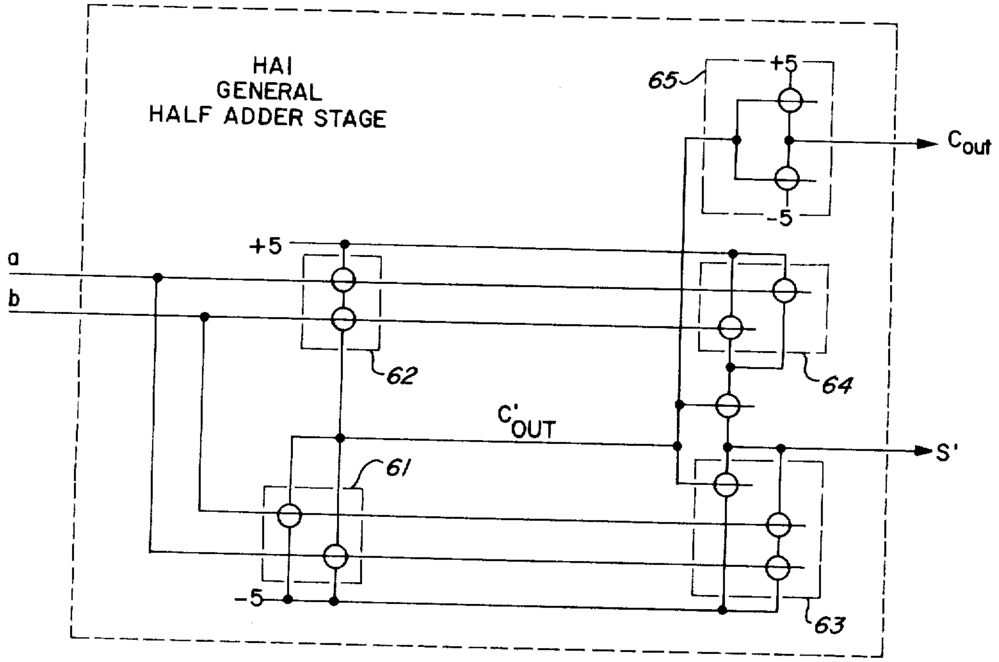
FIG. 2A is a schematic diagram of a half adder stage used in FIG. 1.

In a similar manner the FIG. 2B logic provides a full adder. Transistors 67 provide the logic for a full adder carry-out:

$C'_{out} = ((a + b)c_{in} + ab)'$ Because of the symmetrical nature of the carry-out function, it is a dual of itself so that the logic for the transistor section 68 is the same as transistor section 67. The sum signal is provided by transistor section 69:

$$S' = ((a + b + c)c'_{out} + abc_{in})'$$

For this symmetrical function, the dual provided by transistor section 70 is again identical. The pair of complementing transistors 71 provide a true carry-out, $C_{out} = (C'_{out})'$.

Figure 3:
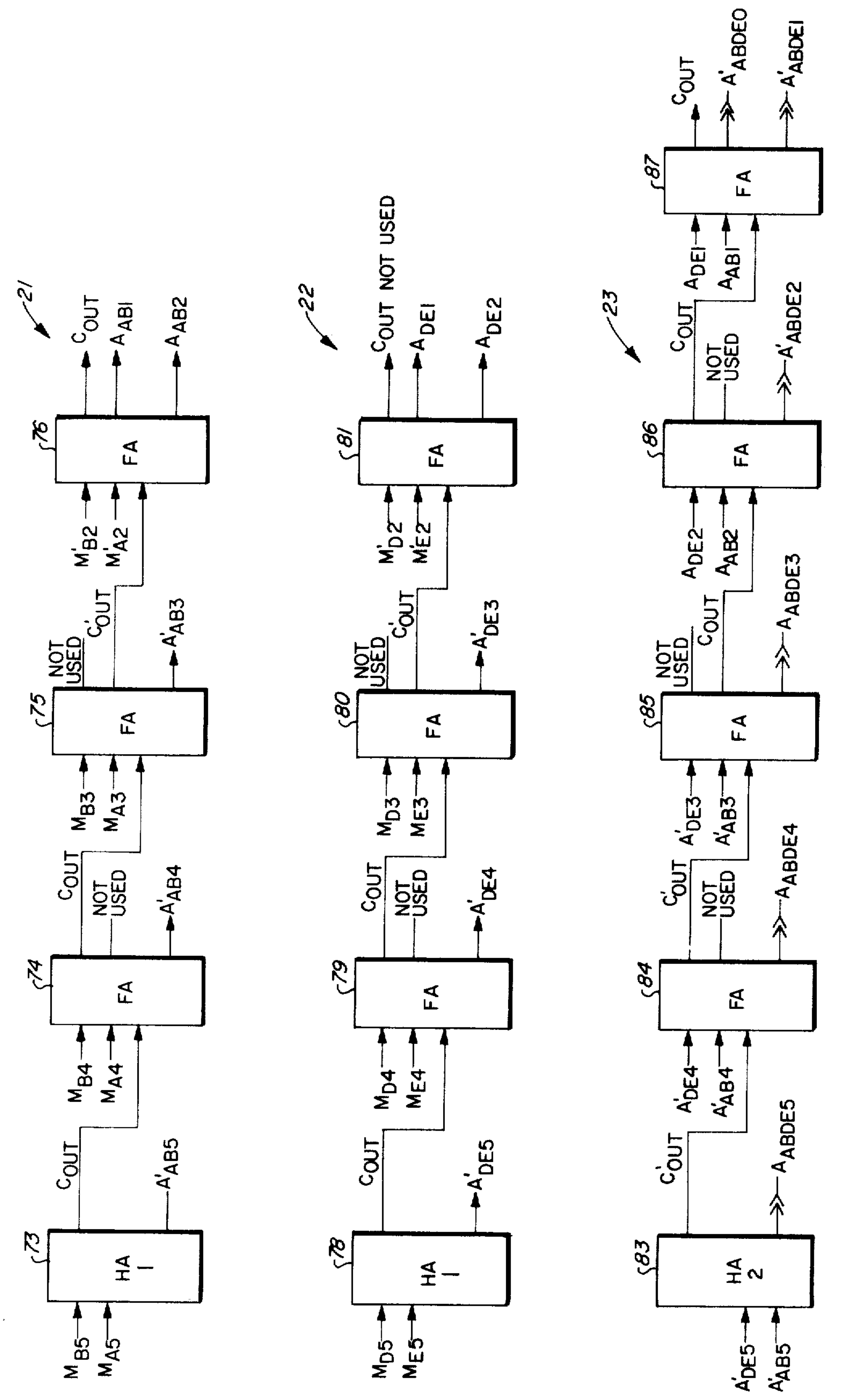
FIG. 3 is a diagram showing how the FIG. 2B full adder stages and FIG. 2A half adder stages are interconnected to form complete adders.

FIG. 3 shows half adder and full adder stages interconnected to form static adders 21-23. Adder 21 is comprised of half adder 73 and full adders 74-76. The half adder 73 receives inputs from the least significant bits of the memory modules 11 and 12, $M_{A5}$ and $M_{B5}$. Full adder 74 receives a carry-in from the half adder 73 carry-out and the next significant bits from modules 11 and 12, $M_{A4}$ and $M_{B4}$. Similarly, full adder 75 receives a carry-in from the full adder 74 carry-out and inputs $M_{A3}$ and $M_{B3}$. Full adder 76 receives complemented inputs $M'_{A2}$ and $M'_{B2}$ together with a complemented carry-in so that a true sum bit is generated. Adder 22 is connected to memory modules 14 and 15 in the same manner. Half adder 78 and full adders 79-81 receive inputs $M_{D2-5}$ and $M_{E2-5}$. Adder 23 receives inputs from the outputs of adders 21 and 22. Half adder 83 (modified to accept complemented inputs) and full adders 84-86 receive the four outputs of corresponding adder stages and full adder 87 receives $C'_{out}$ from each of the most significant stages. The output of adder 23 is made available through output pins so that the size required for module 13 can be determined when the system is assembled.

Figure 4:
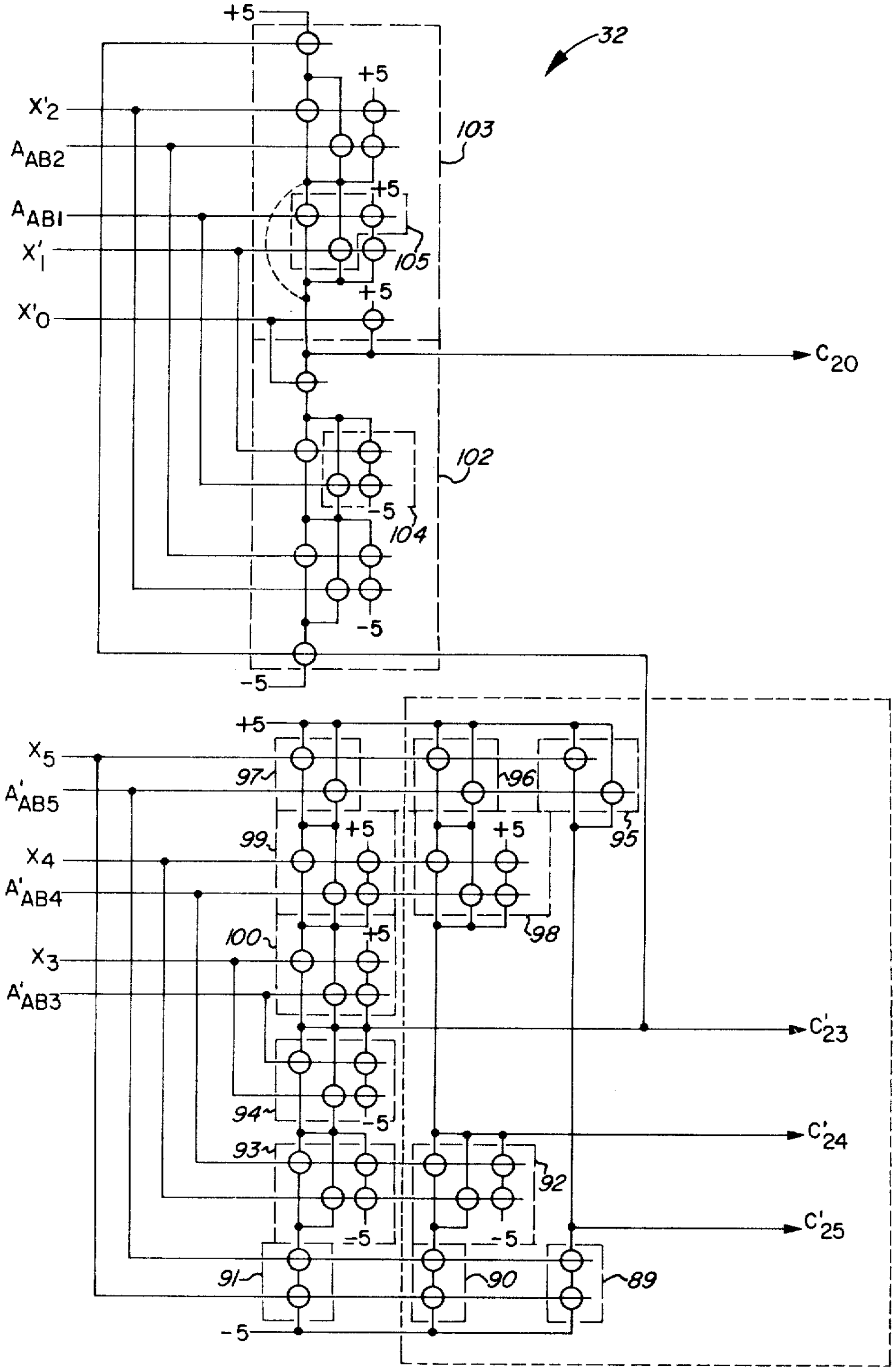
FIG. 4 is a schematic diagram of a FIG. 1 comparator stage.

The comparator 32 of FIG. 4 is basically a carry-look-ahead unit for comparing the input address $X_{0-5}$ with the added size signals $A_{AB1-5}$. For the least significant bits, transistor pair 89 generates the first carry or borrow term:

$$C'_{25} = (X_5A'_{AB5})'$$

Transistor pair 95 provides the complemented logic function for $C'_{25}$. For the outputs $C_{24}$ and $C_{23}$, transistor pairs 90 and 91 provide partial functions identical with $C'_{25}$ and transistor pairs 96 and 97 provide the same function as transistor pair 95. The transistor section 92 provides a generate and propagate relation for the next significant bit, hence:

$$C'_{24} = ((X_5A'_{AB5})(X_4 + A'_{AB4}) + X_4A'_{AB4})'.$$

Transistor section 98, together with transistor 96 provides the complementary function for $C'_{22}$. Transistor sections 93 and 99 duplicate sections 92 and 98 for $C'_{23}$ and the generate and propagate relation for the next significant bit is provided by transistor sections 94 and 100, hence:

$$C'_{23} = (((X_5A'_{AB5})(X_4 + A'_{AB4}) + X_4A'_{AB4})(X_3 + A'_{AB3}) + X_3A_{AB3})'$$

For the most significant bit $C'_{20}$, the logic is extended in a similar manner by transistor sections 102 and 103, hence:

$$C_{20} = (((C'_{23}(X_2 + A_{AB2}) + X'_2A_{AB2})(X'_1A_{AB1}) + X'_1A_{AB1}) \cdot X'_0)'$$

In effect, the composite memory module size is complemented and added to the input address. The carry-out $C_{20}$ for the most significant bit is then a "1" if and only if the input address is greater than $A_{AB}$. The comparators 31, 33 and 34 are essentially the same as comparator 32 except that the comparators 31 and 34 have the transistors in sections 104 and 105 deleted.

Figure 5:
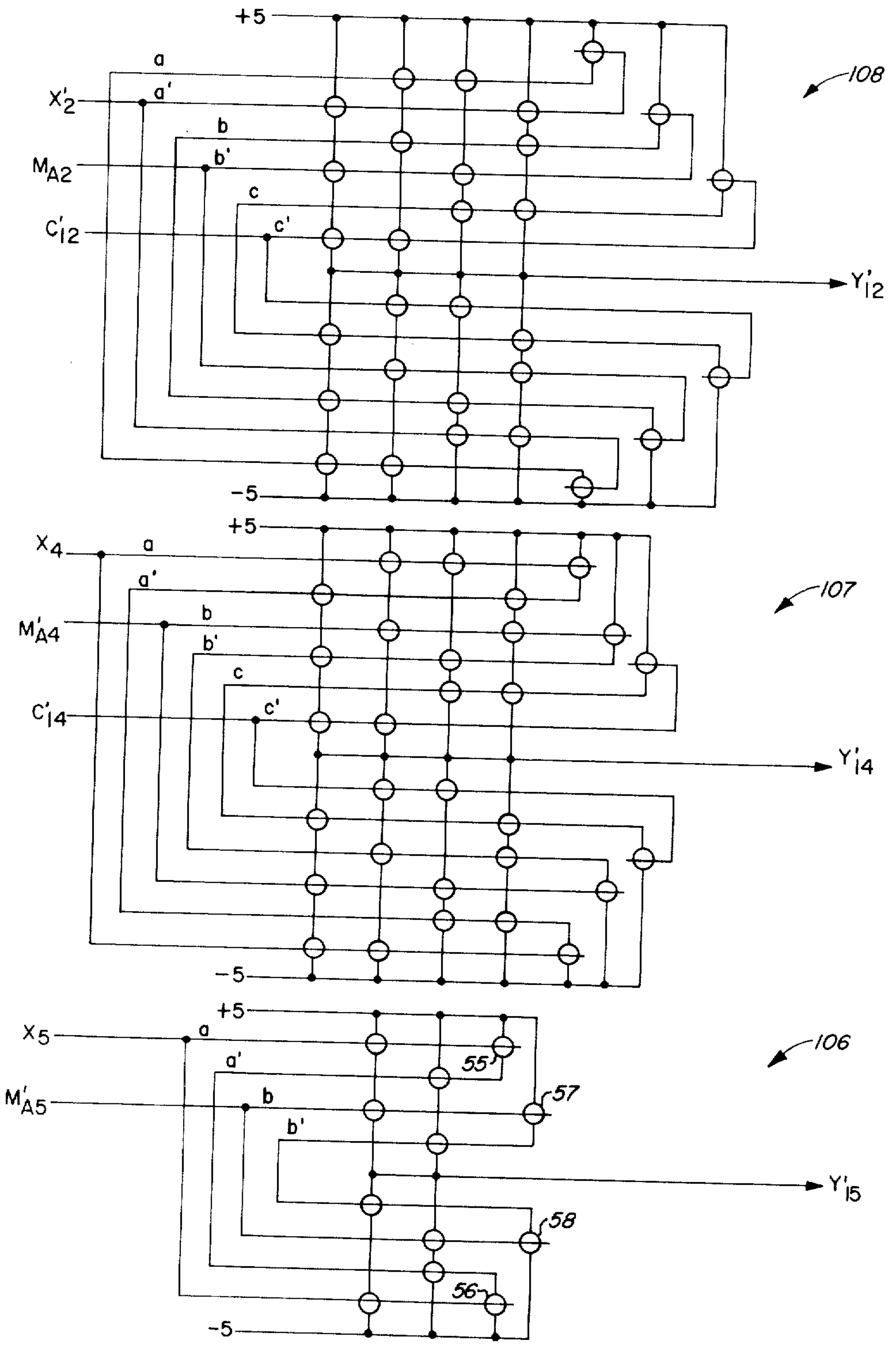
FIG. 5 is a schematic diagram of a FIG. 1 subtracter stage.

Representative subtracter logic is shown in FIG. 5 for subtracter 51. For the least significant bit, logic section 106 forms the exclusive OR function of the inputs $X_5$ and $M'_{A5}$ with a carry-in wired in:

$$Y'_{15} = (X'_5M'_{A5'} + X_5M_{A5})'$$

The pair of transistors 55 and 56 and the pair of transistors 57 and 58 operate as inverters. For the next significant bit, logic 107 forms the sum bit using the carry from comparator 31.

$$Y'_{14} = (X'_4(M'_{A4})'(C'_4)' + X'_4M_{A4}C_4 + X_4M_{A4}'C_4 + X_4M_{A4}C'_4)'.$$

The next significant sum bit $Y_{13}$ uses logic identical to that employed for $Y_{14}$. The sum bit $Y_{12}$ is formed by logic 108:

$$Y'_{12} = (X'_2M_{A2}(C'_2)' + X'_2M_{A2}'C'_2 + (X'_2)'M_{A2}C'_2 + (X'_2)'M_{A2}' \cdot (C'_2)'.$$

Figure 6:
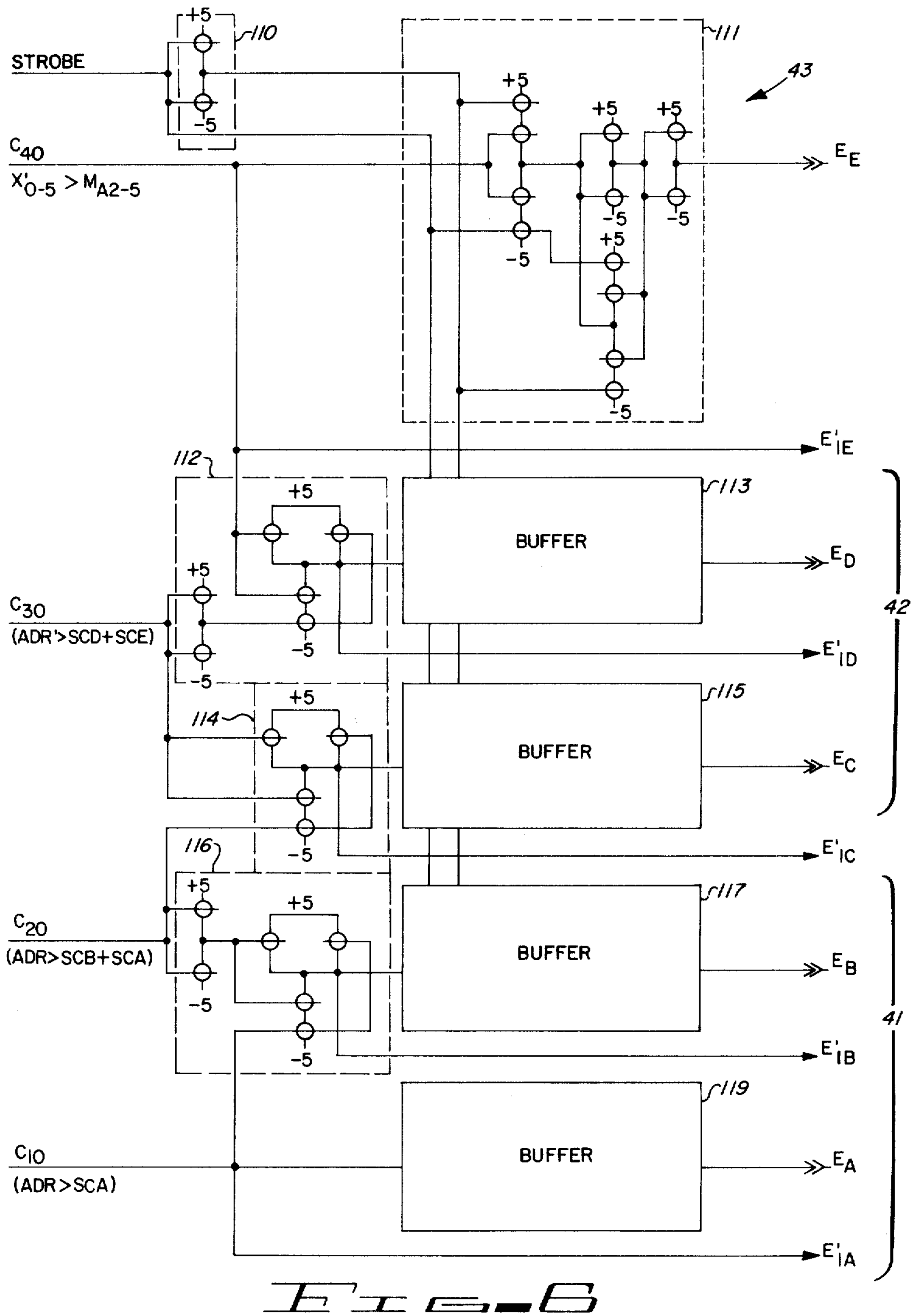
FIG. 6 is a schematic diagram of the FIG. 1 selectors.

Selectors 41–43 are shown in FIG. 6. The output $C_{40}$ of comparator 34 directly provides a signal $E'_{1E}$ in complement form for address selection in the multiplexer 60. The system strobe and its complement generated by transistor pair 110 together with $C_{40}$ are applied to logic 111 to generate the strobed memory module select signal $E_E$. Logic 111 ANDs the strobe with the comparator output $C_{40}$, latches up the result, and provides a signal suitable for driving off chip. Logic 112 inverts comparator 33 output $C_{30}$ and ANDs it with the output $C_{40}$ of comparator 34 to generate the memory module select signal for multiplexer 60. Memory module 14 is therefore selected when the complement of the input address $X'$ is greater than the size $M_{E2-5}$ of module 15 but less than the size of modules 14 and 15. Logic 113, identical with logic 111, generates the strobed off chip module select signal $E_D$. Logic 114 ANDs the outputs $C_{20}$ and $C_{30}$ from comparators 32 and 33 to form memory module select signal $E'_{1B}$. Therefore, memory module 13 is selected when the input address is greater than the sum of the sizes of modules 11 and 12 and the input address complemented is greater than the sum of the sizes of modules 14 and 15. The output $C_{10}$ of comparator 31 is used directly to select $E'_{1A}$ the address for module 11 in the same way as $c_{40}$ was used. The select and buffer logic 115, 117 and 118 are identical with the select and buffer logic 111.

Figure 7:
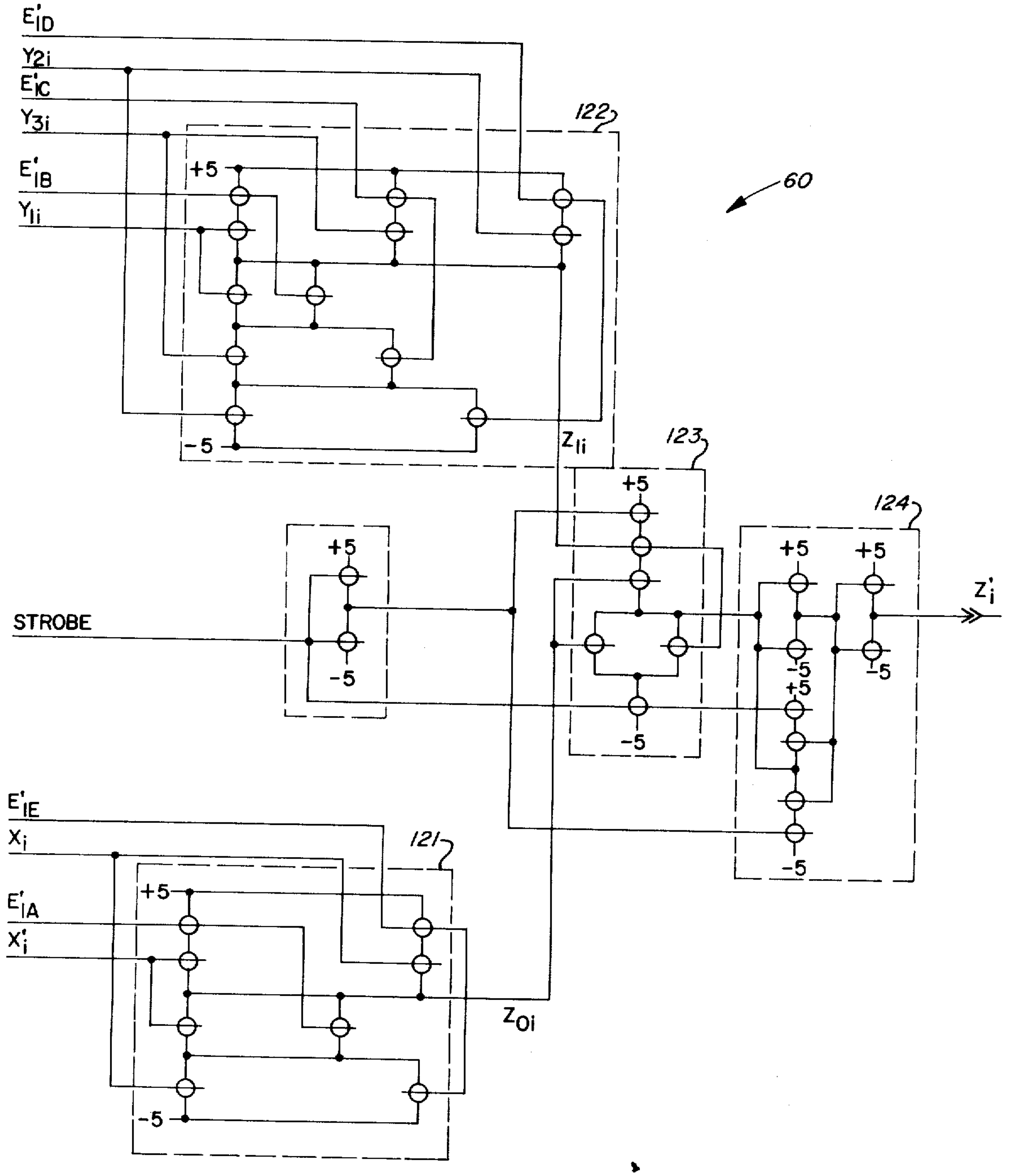
FIG. 7 is a schematic diagram of a FIG. 1 multiplexer stage.

FIG. 7 shows one of four identical stages which comprise multiplexer 60. Logic 121 multiplexes the direct input address bit $X_i$ and its complement $X'_i$ in accordance with the respective select signals $E'_{1A}$ and $E'_{1E}$:

$$Z_{0i} = ((E'_{1A} + X'_i)(E'_{1E} + X_i))' = E_{1A}X_i + E_{1E}X'_i$$

Similarly, logic 122 multiplexes the transformed address bits $Y'_{1i}$, $Y'_{2i}$, and $Y'_{3i}$ from subtracters 51–53 in accordance with the module address select signals $E'_{1B}$, $E'_{1C}$ and $E'_{1D}$.

$$Z_{1i} = ((E'_{1D} + Y'_{2i})(E'_{1C} + Y'_{3i})(E'_{1B} + Y'_{1i}))' = E_{1D}Y_{2i} + E_{1C}Y_{3i} + E_{1B}Y_{1C}$$

Logic 123 combines the multiplexed bit signals by ORing them together.

Logic 124 is similar to the select and buffer logic 111 and generates the off chip address bit signal $Z'_i$.

The computer system of FIG. 1 is versatile. Although it is adapted to serve five memory modules, fewer modules can be used. For example, if four modules can span the address space of $2^{12}$ storage elements, memory module 13 is dispensed with. If three modules are sufficient, module 14 is dispensed with and the input pins to DE adder 22 are connected to a logical zero level supply voltage for the memory device D input. However, with fewer than five modules, an additional bit is required for addressing a module with more than 1,024 memory elements, in general, but no modification is required for the integrated circuit providing the address transformation. The input address lines for $X_{5-11}$ are then connected to the memory modules through inverter 18. Then the input address lines for $X_{0-4}$ are shifted to those inputs previously used for $X_{1-5}$ and a logical one connected as the complement of the most significant bit. Correspondingly, memory modules would then be provided with four size bits representing the number of addressable memory elements modulo 128.

Furthermore, the address transformation integrated circuit is not limited to use in memory assemblies having $2^{12}$ addressable memory elements. By increasing or decreasing the number of low order lines connected directly to the modules, a wide range of memory assembly sizes can be accommodated.

It is understood that the invention should not be construed as being limited to the form of embodiment described and shown herein as many modifications may be made by those skilled in the art without departing from the scope of the invention.

What is claimed is:

1. Apparatus for transforming a set of input binary address signals into a plurality of sets of addresses for at least two pairs of memory modules, such that the aggregate of the module addresses spans the address capcity of the input address signals, comprising:

A. an inverter, responsive to the input address signals, for generating the complement of the input address;

B. a first subtracter, responsive to a set of input address signals and a set of signals representing the number of storage elements in a first memory module, for generating a first set of transformed address signals;

C. a second subtracter, responsive to said inverter and a set of signals representing the number of storage elements in a second memory module, for generating a second set of transformed address signals;

D. a first comparator, responsive to input address signals and a set of signals representing the number of storage elements in a first memory module, for generating a first selection signal indicating that the input address is greater than the capacity of the first memory module;

E. a second comparator, responsive to said inverter and a set of signals representing the number of storage elemtns in a second memory module, for generating a second selector signal indicating that the complement of the input address is greater than the capacity of the second memory module;

F. signals representing the number of storage elements in first and second pairs of memory modules including said first and second memory modules, for generating first and second sums representing the numbers of storage elements in said first and second and pairs of memory modules, respectively;

G. a third comparator, responsive to the input address signals and said first adder for generating a selector signal representing whether or not the input address is greater than said first sum;

H. a fourth comparator, responsive to the complemented input address signals and said second adder for generating a selector signal representing whether or not the complemented input address is greater than said second sum;

I. a third subtracter, responsive to the set of input address signals and a set of signals representing the number of storage elements in said first pair of memory modules for generating a third set of transformed address signals.

J. a multiplexer, receiving the sets of input address signals, complemented input address signals and said transformed address signals, for selecting the desired module address, in response to said selector signals from said comparators.

2. The apparatus of claim 1, further comprising:

K. a set of buffers in said multiplexer for generating output signals suitable for connection off chip.

3. A memory system responsive to a set of input address signals comprising:

A. a plurality of memory modules, each module having a source of signals representing the number of addressable memory cells contained therein;

B. first and second adders, connected to first and second pairs of said memory modules, for generating the respective sums of the number of storage cells;

C. an inverter, responsive to a set of input address signals, for generating the complement of the address;

D. a first comparator, responsive to a first one of said memory modules and the input address signals for generating a plurality of intermediate carry signals and a carry-out signal;

E. a second comparator, responsive to said first adder and the input address signals for generating a plurality of intermediate carry signals and a carry-out signal;

F. third and fourth comparators, similarly responsive to said second adder and the last of said memory modules, respectively, together with the inverted input address signals, from said inverter, each comparator generating a plurality of intermediate carry signals and a carry-out signal;

G. first, second and third subtracters, responsive to the first and last said memory modules and said first adder, respectively, together with said input address signals, for transforming the input address in accordance with the actual sizes of said memory modules whereby a complete set of storage locations is provided for the address span of the input address signals;

H. multiplexer means receiving the input address signals, said inverter output and each of said subtracter outputs, and responsive to the carry-out signals from said comparators for selecting the desired output address.

4. Address transformation apparatus responsive to input address signals comprising:

A. first through fifth memory modules, each module having a set of addressable storage elements and a set of signals representing the number of storage elements therein;

B. an inverter responsive to the input address signals for generating the complement of the input address signals;

C. a first adder, responsive to the signals from said first and second memory modules for providing a first set of limit signals;

D. a second adder, responsive to the fourth and fifth memory modules for providing a second set of limit signals;

E. a first comparator, consisting of carry look-ahead logic, responsive to the input address signals and said first memory module size signals, and the input address signals for generating a plurality of intermediate carry signals and a carry-out signal for providing a set of intermediate carry signals and a carry-out signal;

F. a second comparator, consisting of carry look-ahead logic, responsive to the input address signals and said first adder;

G. a third comparator, responsive to the input address signals and said fifth memory module size signals, and the input address signals for generating a plurality of intermediate carry signals and a carry-out signal;

H. a fourth comparator, responsive to the input address signals and said second adder, and the input address signals for generating a plurality of intermediate carry signals and a carry-out signal;

I. a first substracter, responsive to the input address signals, said first comparator carry signals and said first memory module size signals for generating a first transformed address;

J. a second subtracter, responsive to the input address signals, said third comparator carry signals and said fifth memory module size signals for generating a second transformed address;

K. a third subtracter, responsive to the input address signals, said fourth comparator carry signals and said second adder for providing a third transformed address;

L. a first selector responsive to said first and second comparator carry-out signals when the input address is not greater than said first module size and greater than said first module size but not greater than the sum of the first and second module sizes, respectively;

M. a second selector responsive to said third and fourth comparator carry-out signals for generating fifth and fourth memory module selection signals when the complemented input address is not greater than said fifth module size and greater than said fifth module size but not greater than the sum of the fourth and fifth modules, respectively;

N. a third selector, responsive to said second and fourth comparator carry-out signals for generating a third memory module select signal when the input address is greater than the sum of said first and second module sizes and the complemented input address is greater than the sum of said fourth and fifth module sizes;

O. a multiplexer for gating the input address, one of said transformed addresses or the complemented input address in accordance with said memory module select signals.

* * * * *